United States Patent [19]
Asakura et al.

[11] Patent Number: 5,452,154
[45] Date of Patent: Sep. 19, 1995

[54] FRONT LOADING CASSETTE RECEIVING APPARATUS HAVING A CASSETTE HOLDER WHICH IS GUIDED IN ITS TRAVEL BY THREE INTERSECTING GUIDE GROOVES

[75] Inventors: Keichi Asakura; Fumio Yamazaki, both of Tokyo, Japan

[73] Assignee: Goldstar Co., Ltd., Seoul, Rep. of Korea

[21] Appl. No.: 162,622

[22] Filed: Dec. 7, 1993

[30] Foreign Application Priority Data

Dec. 7, 1992 [JP] Japan .............................. 4-084077 U
Dec. 11, 1992 [JP] Japan .............................. 4-085294 U

[51] Int. Cl.⁶ .................................................. G11B 5/008
[52] U.S. Cl. ........................................ 360/96.5; 360/85
[58] Field of Search ................................ 360/96.5, 85

[56] References Cited

U.S. PATENT DOCUMENTS

| | | | |
|---|---|---|---|
| 4,808,011 | 2/1989 | Aarts | 360/96.5 |
| 5,103,357 | 4/1992 | Nakanishi | 360/96.5 |
| 5,184,261 | 2/1993 | Noguchi | 360/96.5 |
| 5,196,972 | 3/1993 | Matsumaru | 360/96.5 |
| 5,240,200 | 8/1993 | Nishimura | 360/96.5 |

FOREIGN PATENT DOCUMENTS 244376  3/1990  Japan .

*Primary Examiner*—A. J. Heinz

[57] ABSTRACT

A cassette loading device of the front loading type for a recording and reproducing apparatus including a cassette holder for holding a tape cassette to be loaded and ejected under a condition that the tape cassette is transversely laid, a supporting base body for receiving the cassette holder and supporting it to be movable between a cassette loading/ejecting position and a recording/reproducing position, a drive pin and a pair of guide pins provided at each of a pair of parallel sliding side plates constituting a part of a cassette holder, each of the pins being adapted to perform a horizontal movement and a vertical movement on the support base body to feed a tape cassette between a loading/ejecting position and a recording/reproducing position, and three guide tracks provided at each of a pair of parallel fixed side plates constituting a part of the support base body, each of the guide tracks having a first guide portion for guiding the horizontal movement of each corresponding one of the pins and a second guide portion for guiding the vertical movement of each corresponding one of the pins, the first guide portion of one of the guide tracks crossing the vertical guide portion of another guide track, and a driving mechanism for moving the cassette holder in the supporting base body.

8 Claims, 16 Drawing Sheets

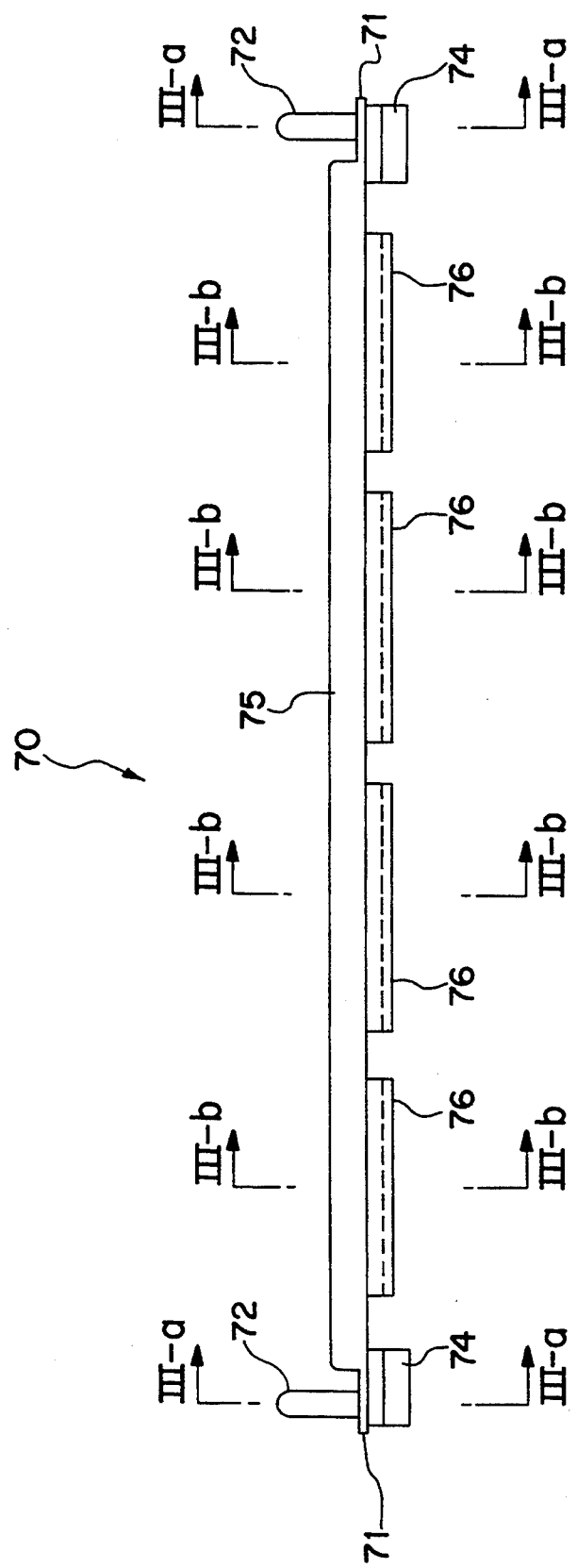

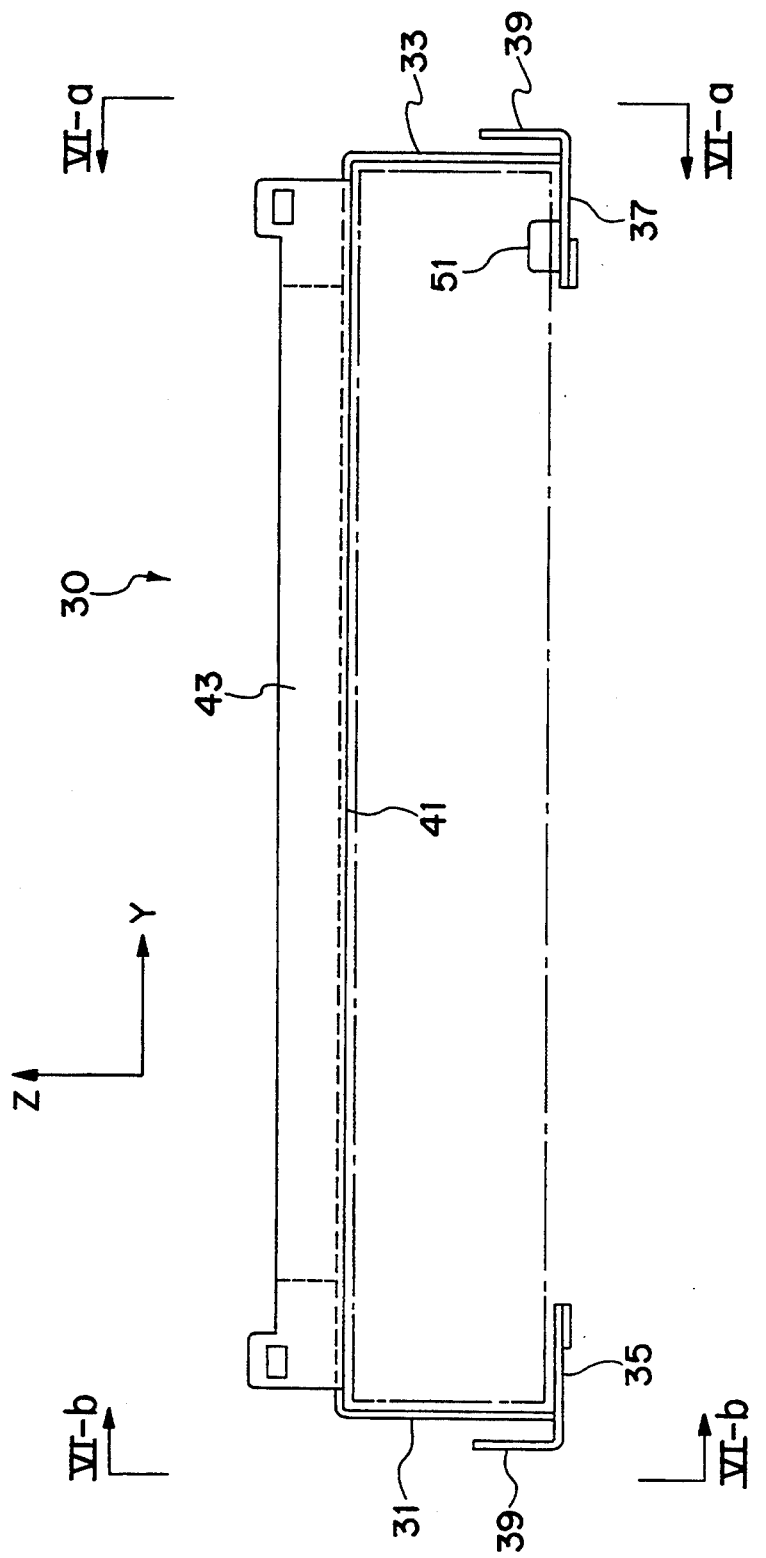

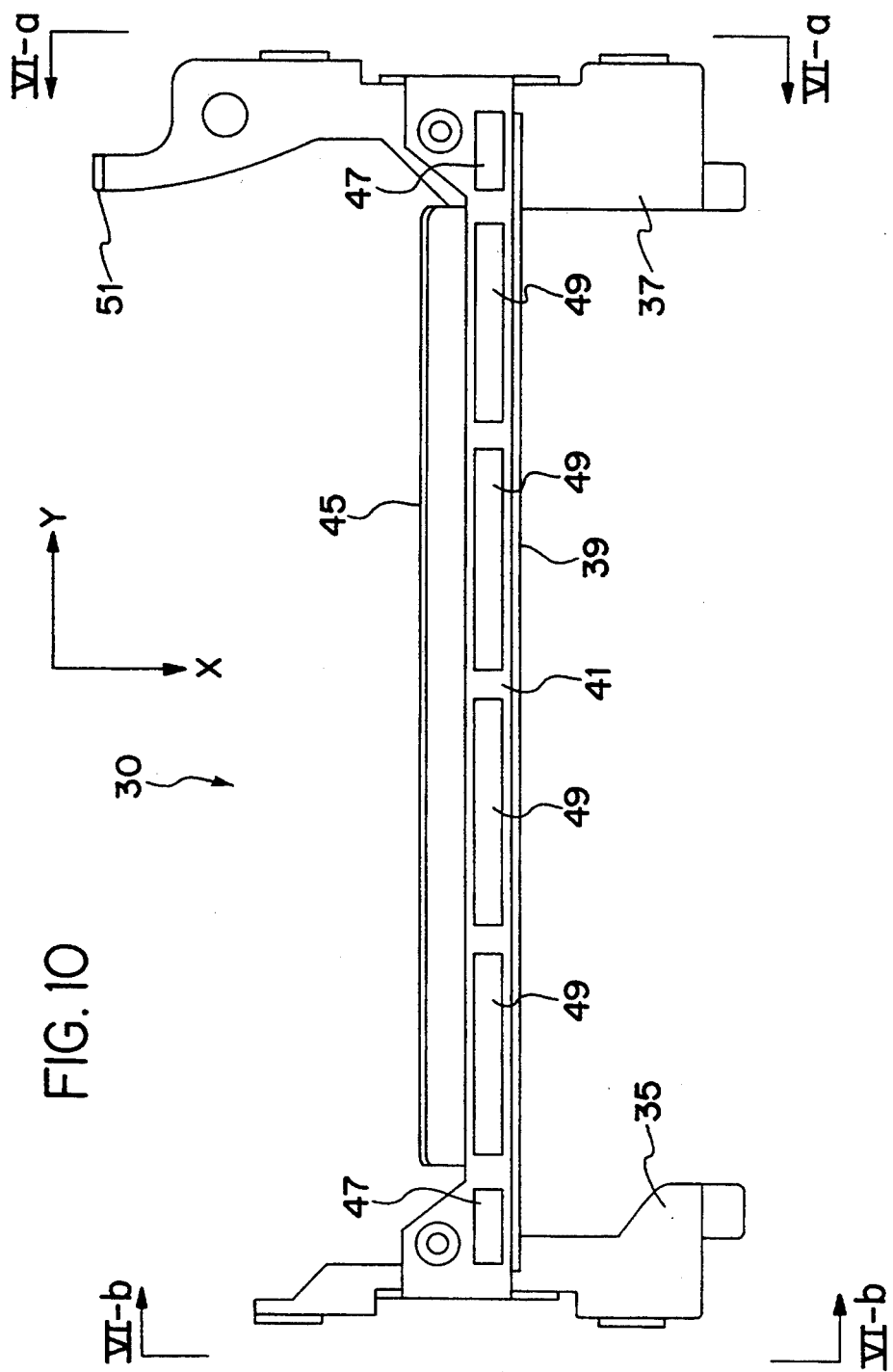

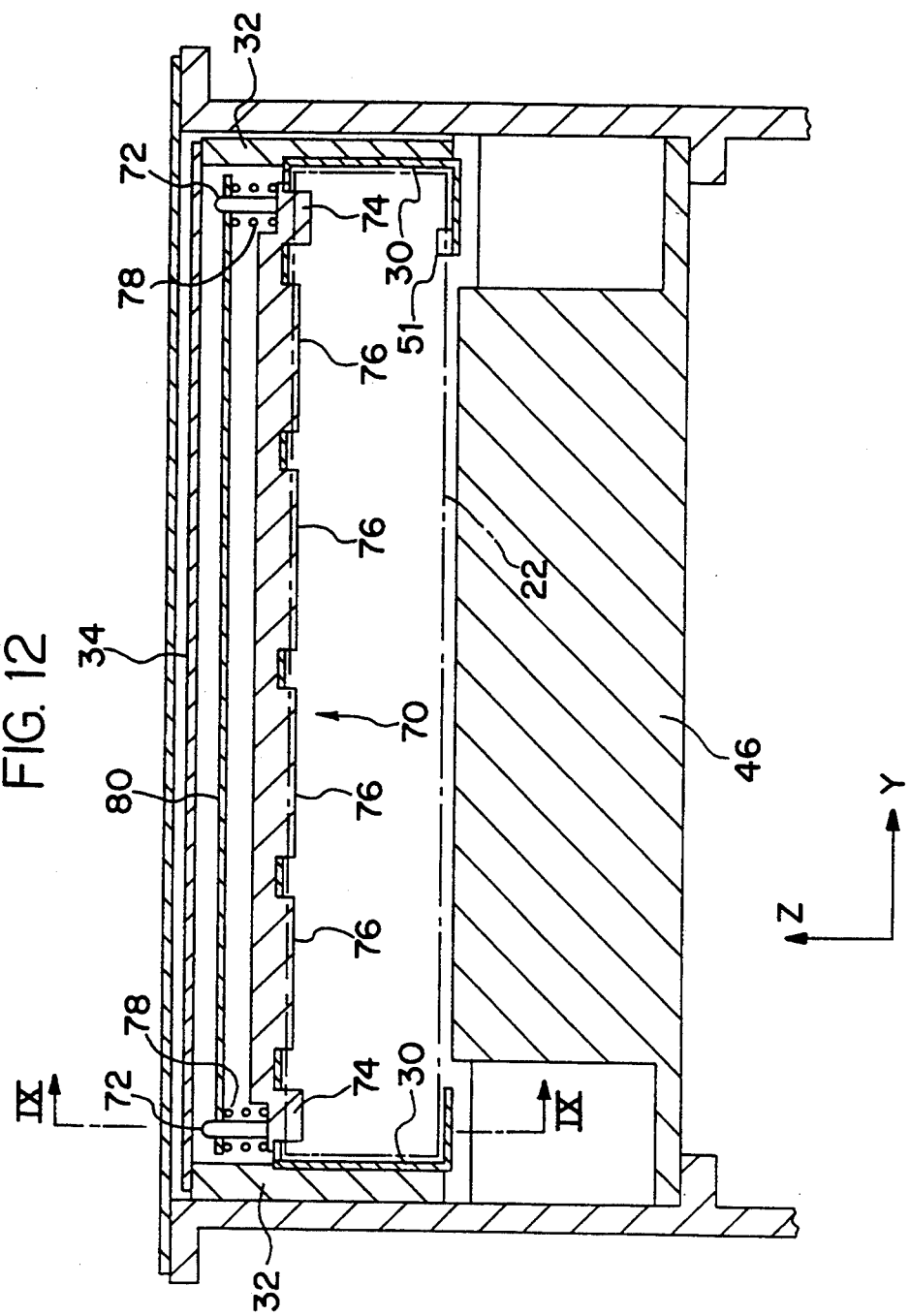

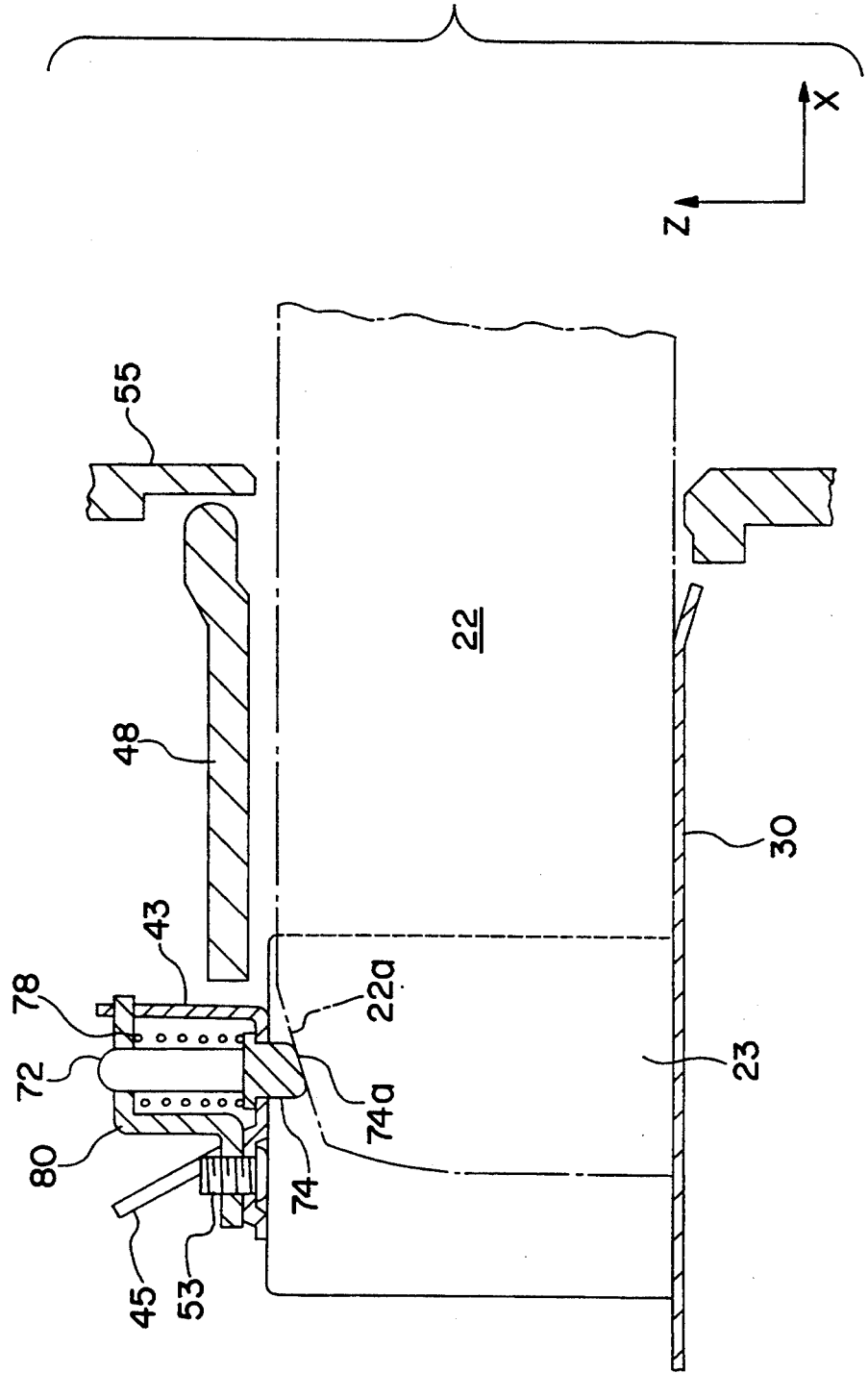

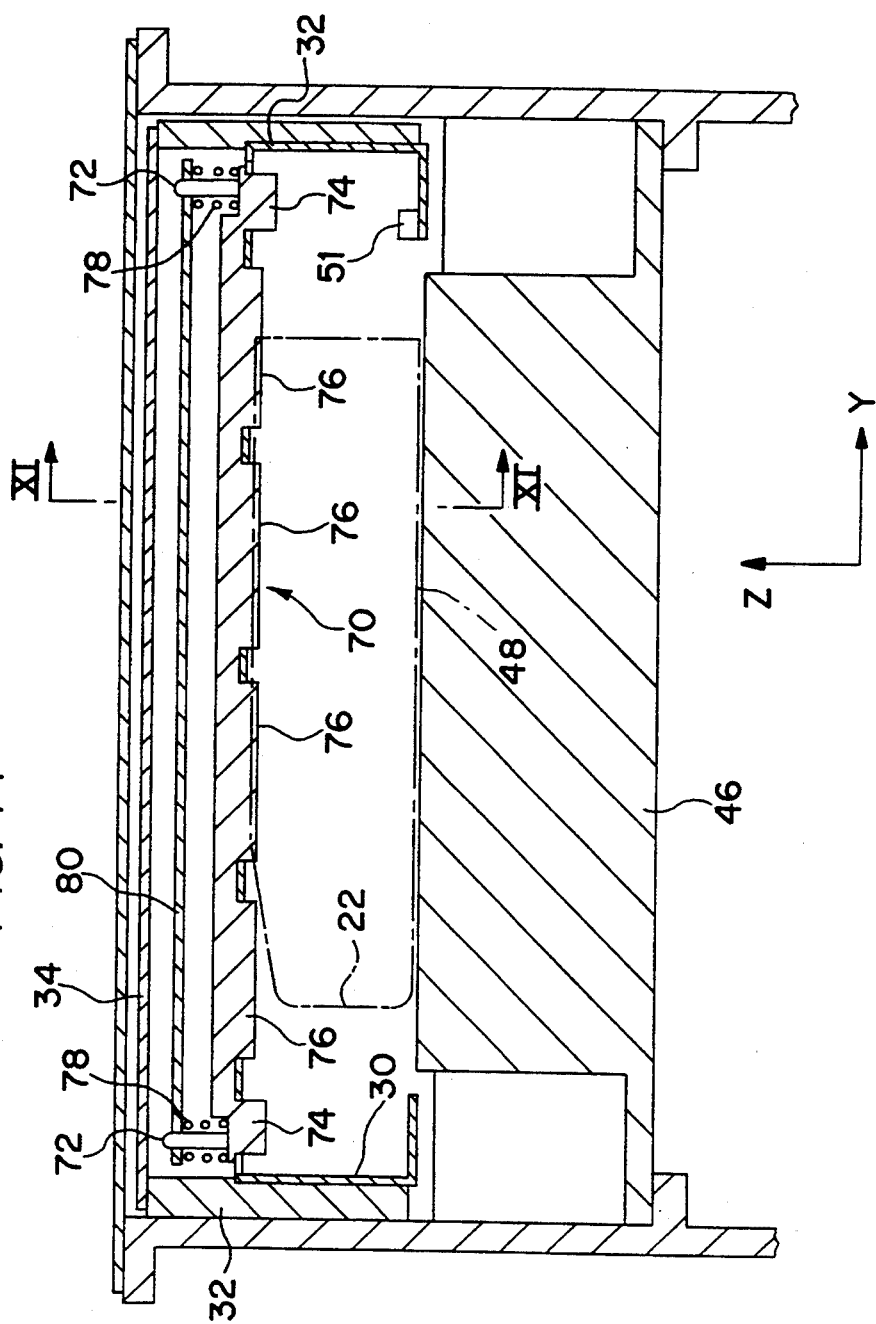

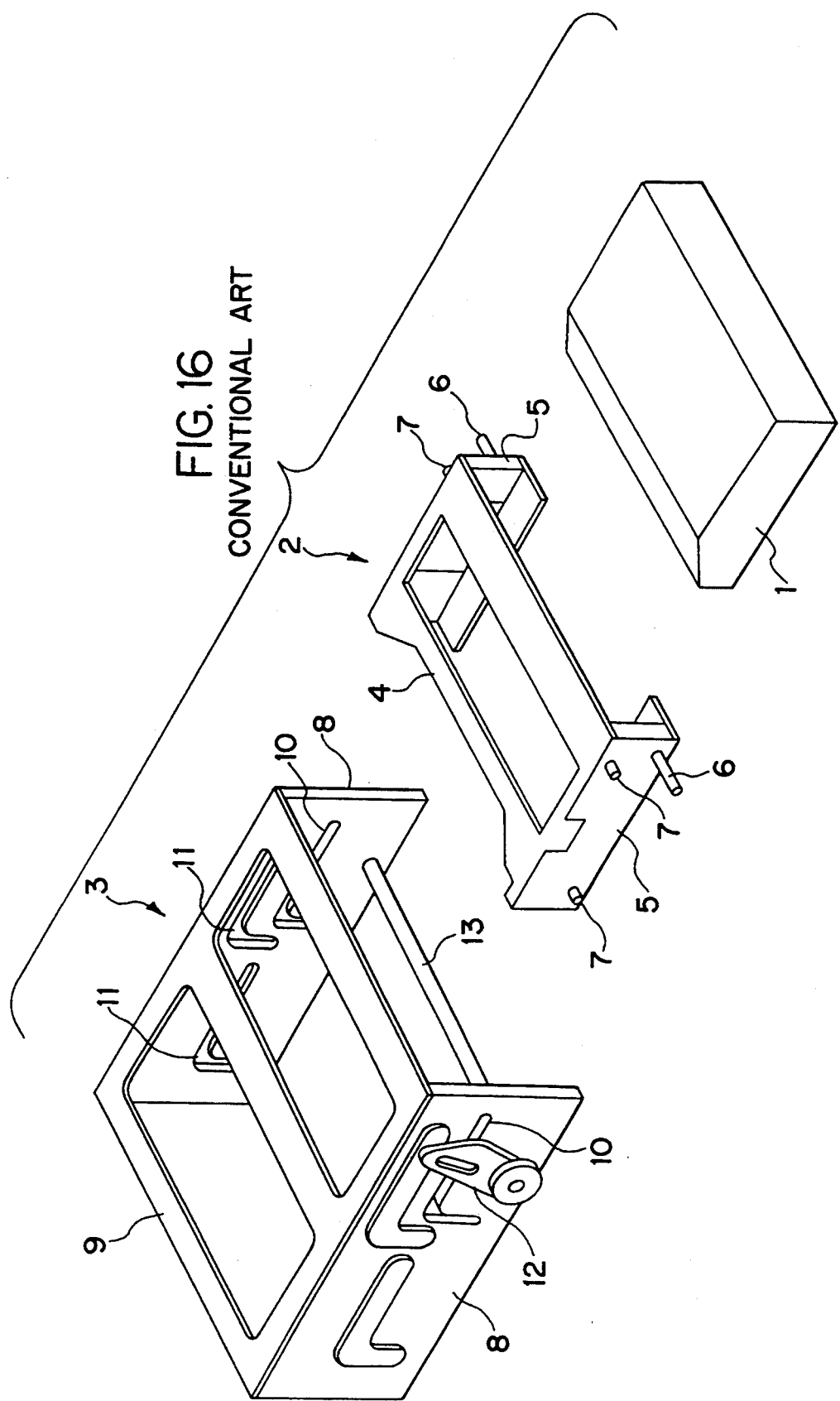

FRONT LOADING CASSETTE RECEIVING APPARATUS HAVING A CASSETTE HOLDER WHICH IS GUIDED IN ITS TRAVEL BY THREE INTERSECTING GUIDE GROOVES

BACKGROUND OF THE INVENTION

1. Field of the Invention

The present invention relates to a video cassette tape recorder (VCR) equipped with a cassette loading device of the front loading type, and more particularly to a cassette loading device equipped with an erroneous insertion preventing device.

2. Description of the Prior Art

Generally, a recording and reproducing apparatus such as a VCR for a magnetic tape cassette is equipped with a cassette loading device for feeding a tape cassette between a loading/ejecting position and a recording/reproducing position and determining the position of the tape cassette at each of the operation positions. In particular, in a recording and reproducing apparatus provided at its front wall with a loading/ejecting opening for a tape cassette, a cassette loading device of the front loading type is widely used which includes a cassette holder for holding the tape cassette to be loaded and ejected under a condition that the tape cassette is transversely laid in parallel to the direction that the tape cassette is fed.

Such a cassette loading device of the front loading type is illustrated in FIG. 16. This cassette loading device includes a cassette holder 2 for holding a tape cassette 1 to be loaded and ejected under a condition that the tape cassette is transversely laid, a supporting base body 3 for receiving the cassette holder 2 and supporting it to be movable between a cassette loading/ejecting position and a recording/reproducing position, and a driving mechanism for moving the cassette holder 2 in the supporting base body 3. The cassette holder 2 comprises a frame 4 for supporting the upper and lower surfaces of the tape cassette 1, and a pair of sliding side plates 5 downwardly extending from both lateral ends of the frame 4 to support both side surfaces of the tape cassette 1, respectively. Each sliding side plate 5 has a drive pin 6 and a pair of guide pins 7 so as to guide the cassette holder 2 in the supporting base body 3. The drive pin 6 and guide pins 7 are outwardly protruded from the outer surface of the sliding side plate 5. The supporting base body 3 has a pair of fixed side plates 8 downwardly extending from both lateral ends of a frame 9 to support both sliding side plates 5 of the cassette holder 2, respectively. Each of the fixed side plates 8 has a L-shaped guide slot 10 for receiving the drive pin 6 protruded from each corresponding sliding side plate 5 and a pair of L-shaped guide slots 11 for receiving the guide pins 7 protruded from each corresponding sliding side plate 5, respectively. Each of the drive pin 6 is outwardly protruded through the guide slot 10 of each corresponding fixed side plate 8 so that its protruded end is coupled to a drive lever 12 connected to a drive mechanism not shown. When the tape cassette 1 is to be fed, each drive pin 6 moves along each corresponding guide slot 10 by the rotation of a shaft 13 of the drive levers 12. Since the guide pins 7 are also engaged in the corresponding guide slots 11, respectively, the cassette holder 2 moves along a L-shaped path while it is supported at three fulcrums.

For feeding the tape cassette between the loading/ejecting position and the recording/reproducing position, the cassette loading device of the front loading type performs a movement operation obtained by a horizontal movement and a vertical movement carried out along the L-shaped path defined by the guide slots 10 and 11. This movement operation enables the tape cassette 1 received in the cassette holder 2 to be engaged with and disengaged from heads and reels for recording/reproducing operations arranged at the recording/reproducing position. Generally, two guide pins 7 are arranged on each sliding side plate 5 of the cassette holder 2 at positions apart different radiuses from the drive pin 6, respectively, so that the guide pins 7 follow accurately the drive pin 6 as the drive fulcrum of the cassette holder 2, in particular, at the curved portion of the L-shaped path, thereby preventing an undesirable operation of the cassette holder 2 such as a slanting phenomenon. As a result, each fixed side plate 8 of the supporting base plate 3 has three guide tracks each of which guides each corresponding pin along the L-shaped path. Among the guide tracks, the guide track for the drive pin 6 is constituted by a bottom-reinforced slot for a maintenance of the strength of the fixed side plate 8. The three guide tracks are formed on the fixed side plate 8 at independent positions so that they do not cross one another in order to accurately and smoothly guide the pins.

Such independent arrangements of the guide tracks on the fixed side plate causes inevitably an increase area of the fixed side plate. Furthermore, the spaces among the three pins of the cassette holder are increased, thereby resulting in an increased area of the sliding side plate. As a result, there is a limitation on compactness in the conventional cassette loading device. This causes a difficulty to provide a recording and reproducing apparatus with a compact construction.

The travel distance of the tape cassette between the loading/ejecting position and the recording/reproducing position is determined by the construction of the recording and reproducing apparatus. For providing a cassette loading device with a more compact construction, the three guide tracks should be integrated on a small area of the fixed side plate because the above-mentioned travel distance can not be varied. To this end, a cross arrangement of the guide tracks may be conceived. However, such a cross arrangement encounters a difficulty to accurately and smoothly guide the drive pins and the guide pins of the cassette holder at cross portions of the guide tracks.

When the tape cassette is erroneously inserted in the cassette loading device, for example, under a condition that it is inverted or longitudinally laid, precise elements of the internal mechanism of the VCR may be damaged. For avoiding such a damage, the conventional cassette loading device has erroneous insertion preventing means equipped in the cassette holder. An example of such erroneous insertion preventing means is disclosed in Japanese Utility Model Laid-open Publication No. Heisei 2-44376. However, this device is adapted to mainly utilize erroneous insertion preventing grooves provided at VHS type video tape cassettes. There has not been proposed any erroneous insertion preventing device for 8 mm video tape cassettes the use of which is on an increasing trend.

SUMMARY OF THE INVENTION

The present invention has been made in view of problems encountered in the guide construction of the conventional cassette loading device and an object of the invention is, therefore, to provide a cassette loading device of the front loading type having a cassette holder guiding construction capable of accurately and smoothly guiding the movement of a cassette holder and achieving a compactness.

In accordance with the present invention, this object can be accomplished by providing a cassette loading device of the front loading type for a recording and reproducing apparatus comprising: a cassette holder for holding a tape cassette to be loaded and ejected under a condition that the tape cassette is transversely laid; a supporting base body for receiving said cassette holder and supporting it to be movable between a cassette loading/ejecting position and a recording/reproducing position; guide means for guiding the cassette holder in said supporting base body in a predetermined direction, said guide means including a drive pin and a pair of guide pins provided at each of a pair of parallel sliding side plates constituting a part of a cassette holder, each of said pins being adapted to perform a horizontal movement and a vertical movement on the support base body to feed a tape cassette between a loading/ejecting position and a recording/reproducing position, and three guide tracks provided at each of a pair of parallel fixed side plates constituting a part of the support base body, each of said guide tracks having a first guide portion for guiding the horizontal movement of each corresponding one of the pins and a second guide portion for guiding the vertical movement of each corresponding one of the pins, said first guide portion of one of the guide tracks crossing said vertical guide portion of another guide track; and a driving mechanism for moving the cassette holder in the supporting base body.

The first guide portion of each of the guide tracks extends in parallel to a cassette ejecting direction and the second guide portion of the same guide track is perpendicular to the first guide portion so that all the guide tracks define similar L-shaped paths for guiding the pins, respectively. One of the guide pins has a length larger than that of the other guide pin, and the guide tracks include a throughout guide slot for receiving the drive pin, a first guide groove for receiving the longer guide pin and a second guide groove for receiving the shorter guide pin, respectively. The first and second guide grooves are formed on each of the fixed side plate to cross each other so that the first guide groove has a track portion extending along the first guide portion while the second guide groove has a track portion extending along the second guide portion at a cross area between the first and second guide grooves, and the first guide groove has a depth enough to approximately receive the full length of the longer guide pin whereas the second guide groove has a depth smaller than that of the first guide groove to receive only the full length of the shorter guide pin.

Another object of the invention is to provide an erroneous insertion preventing device applicable to 8 mm video tape cassettes.

In accordance with the present invention, this object can be accomplished by providing an erroneous insertion preventing device of a recording and reproducing apparatus equipped with a cassette loading device of the front loading type, comprising: an erroneous insertion preventing member mounted to a connection member constituting a part of the cassette holder to be vertically movable and adapted to prevent an erroneous insertion of the tape cassette, said erroneous insertion preventing member including at least one first protrusion and at least second protrusion both disposed in a cassette insertion path to extend in transverse to a cassette insertion direction, said protrusions being movable approximately in perpendicular to the cassette insertion direction toward and away from the tape cassette, said first protrusion being adapted to come into contact with the tape cassette being correctly inserted and thereby move the erroneous insertion preventing member away from the tape cassette so that both the first and second protrusions can be removed out of the cassette insertion path, while said second protrusion being adapted to come into contact with the tape cassette being erroneously inserted and thereby prevent a further insertion of the tape cassette.

BRIEF DESCRIPTION OF THE DRAWINGS

Other objects and aspects of the invention will become apparent from the following description of embodiments with reference to the accompanying drawings in which:

FIG. 7 is a front view of an erroneous insertion preventing member of the erroneous insertion preventing device;

FIG. 9 is a front view of the cassette holder;

FIG. 10 is a front view of the cassette holder;

FIG. 12 is a cross-sectional view taken along the line VIII—VIII of FIG. 1B, illustrating a state that a tape cassette is correctly inserted;

FIG. 13 is a cross-sectional view taken along the line IX—IX of FIG. 12;

FIG. 14 is a cross-sectional view similar to FIG. 12, illustrating a state that a tape cassette is erroneously inserted;

FIG. 16 is a schematic perspective view of a conventional cassette loading device.

DESCRIPTION OF THE PREFERRED EMBODIMENTS

Figure 1A:
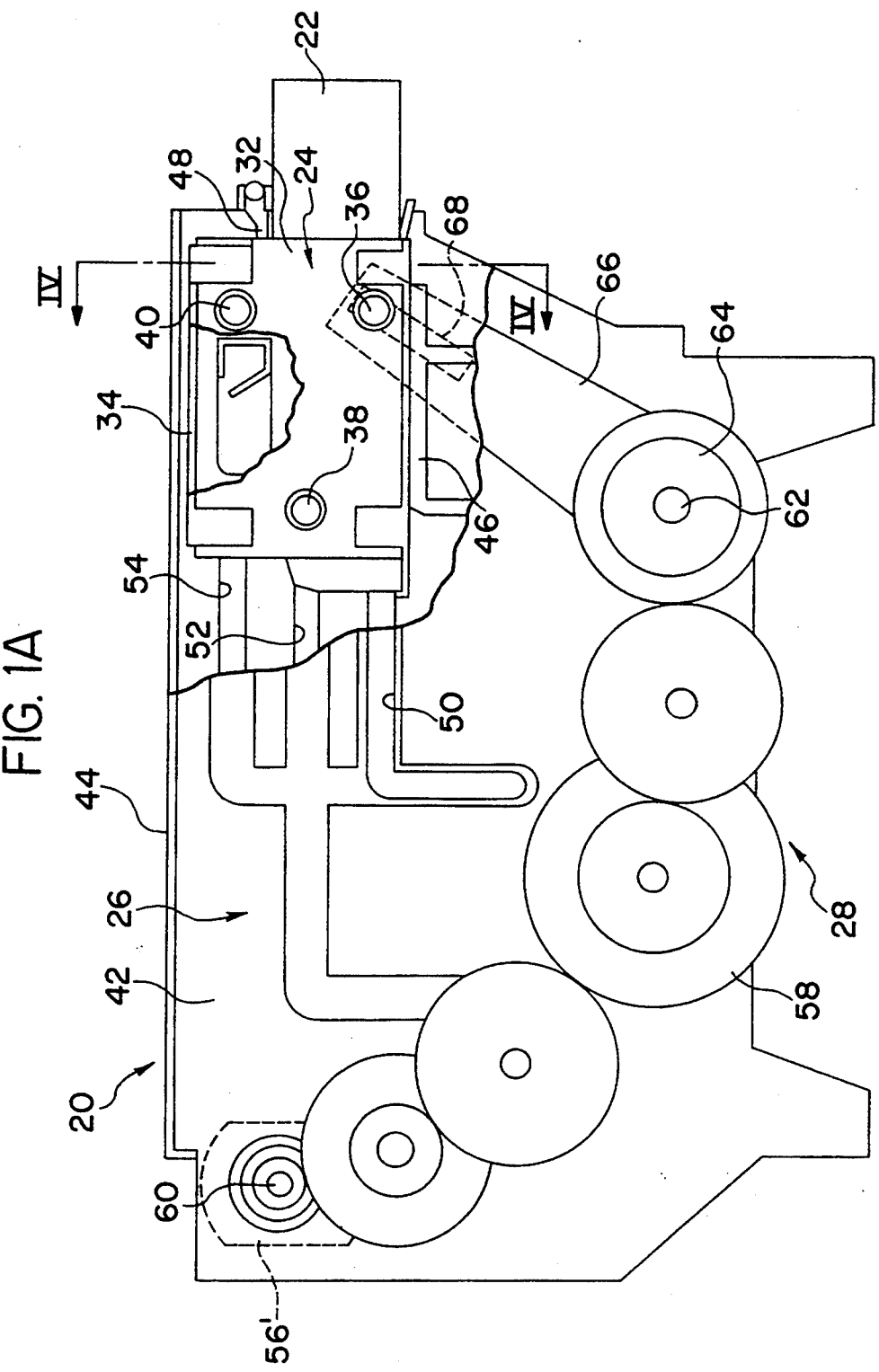
FIG. 1A is a partially-broken side view of a cassette loading device in accordance with the present invention.
Figure 1B:
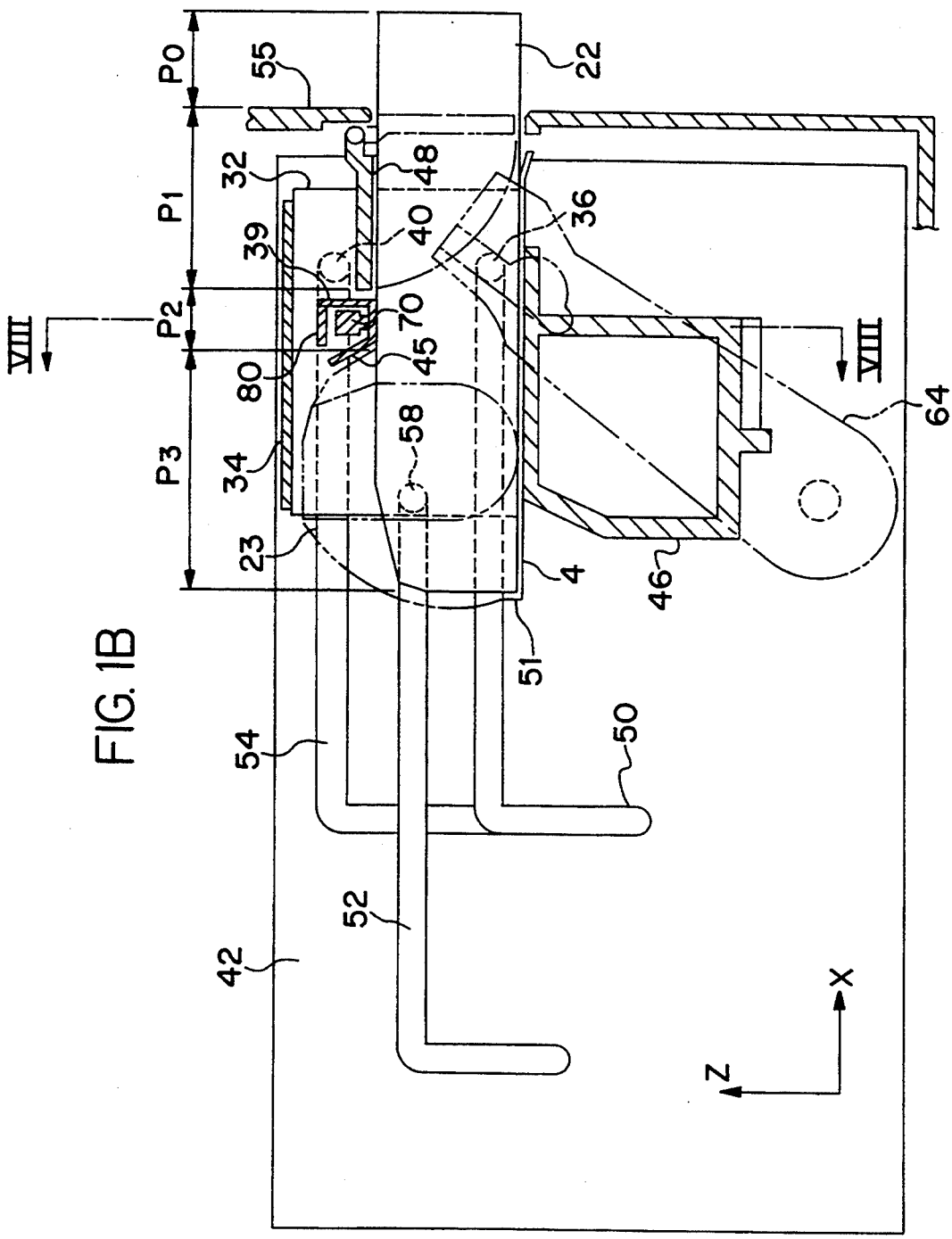
FIG. 1B is a schematic sectional view of the cassette loading device equipped with an erroneous insertion preventing device in accordance with the present invention.

Referring to FIGS. 1A and 1B, there is illustrated a cassette loading device of a recording and reproducing apparatus in accordance with the present invention. As shown in the drawings, the cassette loading device which is denoted by the reference numeral 20 includes a cassette holder 24 for holding a tape cassette 22 to be loaded and ejected under a condition that the tape cassette is transversly laid, a supporting base body 26 for receiving the cassette holder 24 and supporting it to be movable between a cassette loading/ejection position and a recording/reproducing position, and a driving mechanism 28 for moving the cassette holder 24 in the supporting base body 26.

Figure 2:
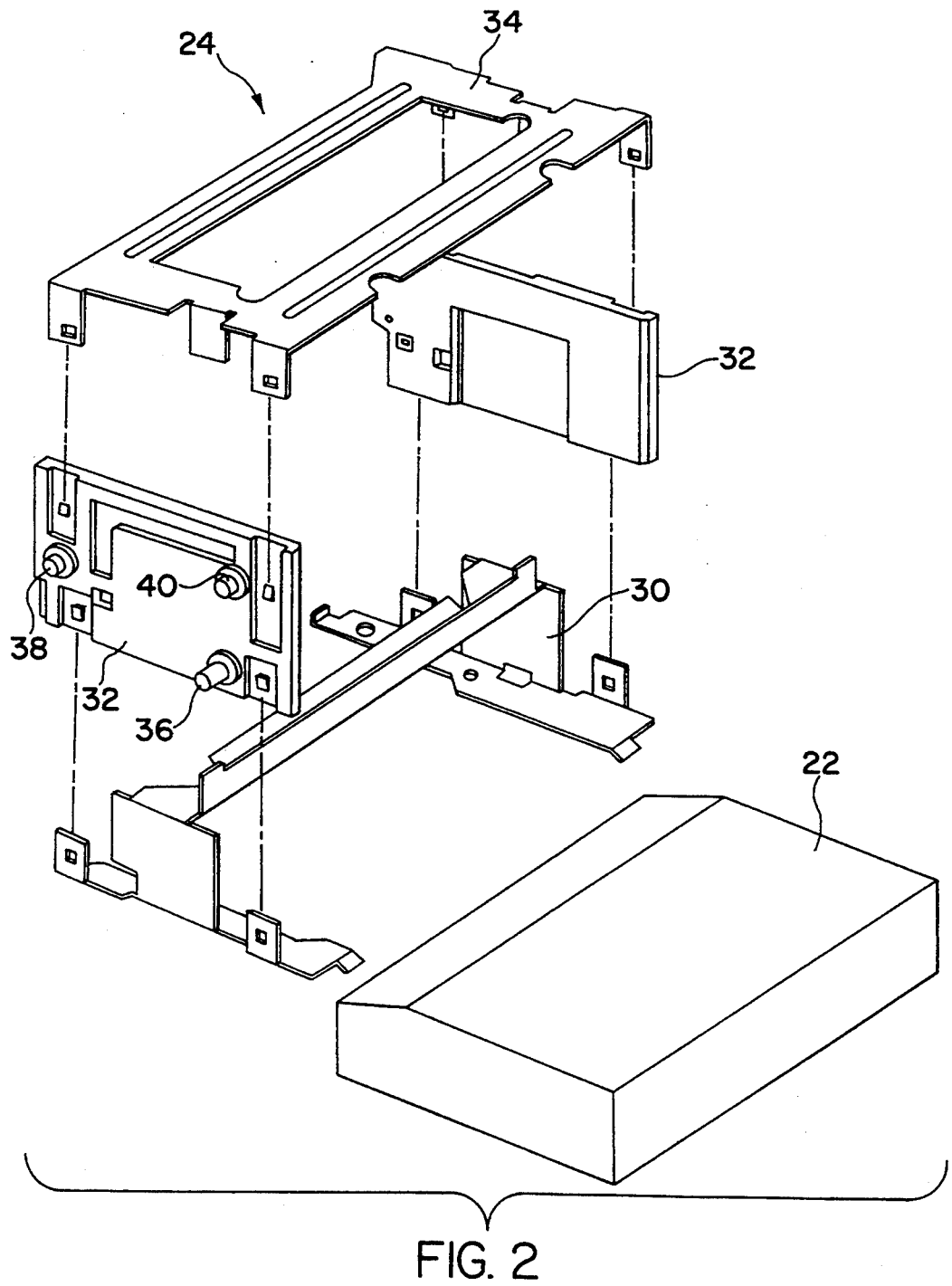
FIG. 2 is an exploded perspective view of a cassette holder of the cassette loading device shown in FIGS. 1A and 1B.

As shown in FIG. 2, the cassette holder 24 includes a first frame 30 made of a metal sheet and adapted to directly support the tape cassette 22, a pair of facing sliding side plates 32 made of a resin material and fixedly mounted to both lateral ends of the first frame 30, respectively, and a second frame 34 made of a metal sheet and adapted to ensure the fixing of the sliding side plates 32. Each sliding side plate 32 has guide means adapted to guide the cassette holder 24 along a predetermined path in the supporting base body 26. The guide means comprises a drive pin 36 and a pair of guide pins 38 and 40 all outwardly protruded from the outer surface of the sliding side plate 32. In FIG. 2, only the drive pin 36 and the guide pins 38 and 40 of the left sliding side plate 32 are shown. The guide pins 38 and 40 have different lengths so that the guide pin 38 is longer than the guide pin 40.

The cassette holder 24 has extensions 39 for coupling the sliding side plates 32 to the first frame 30 and the second frame 34.

Figure 3:
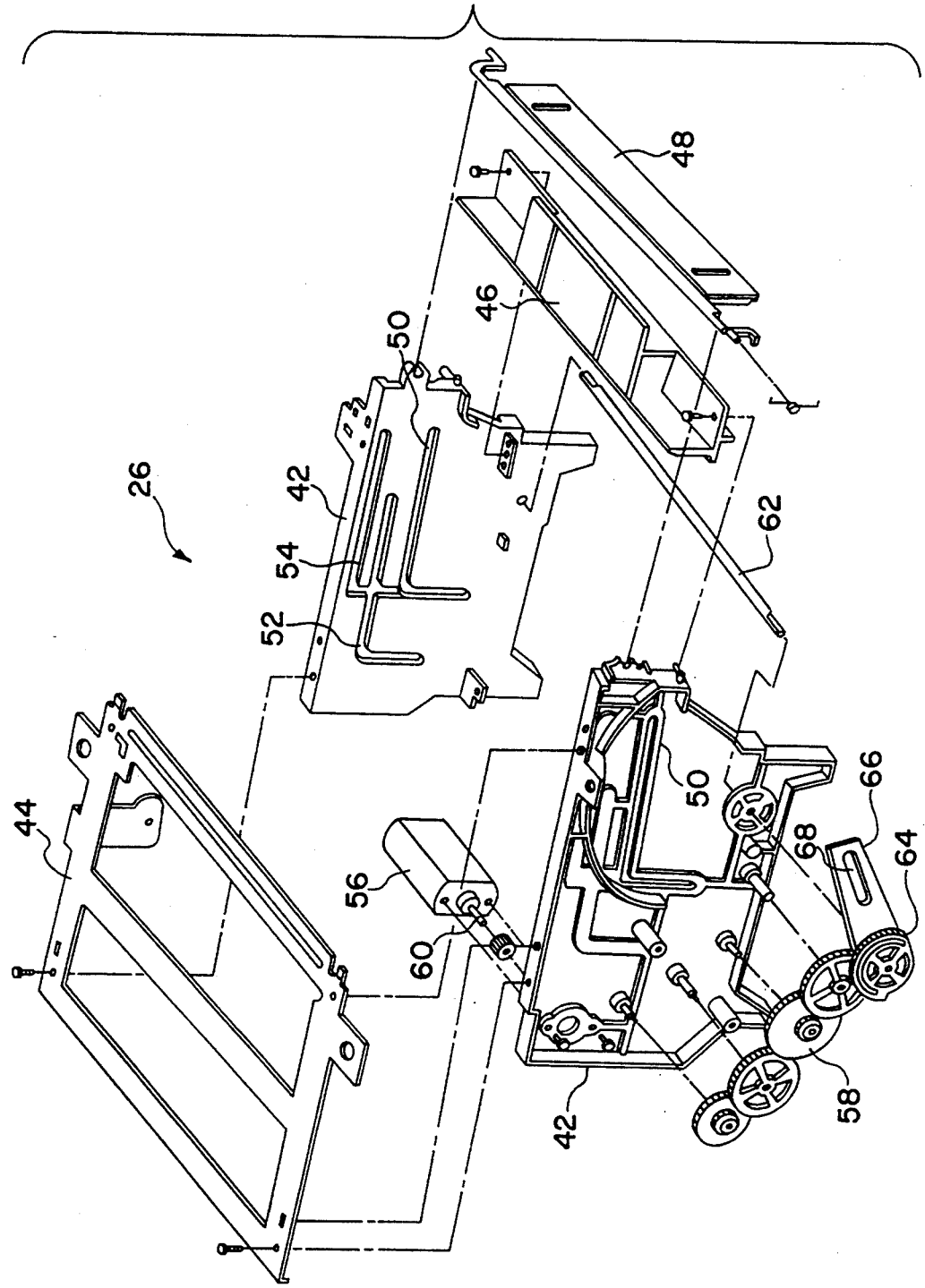
FIG. 3 is an exploded perspective view of a support base body of the cassette loading device shown in FIGS. 1A and 1B.

As shown in FIG. 3, the supporting base body 26 includes a pair of spaced fixed side plates 42 made of a resin material and disposed outwardly of the sliding side plates 32 of the cassette holder 24, respectively, a frame 44 adapted to firmly support the fixed side plates 42, a support member 46 adapted to support the lower surface of the tape cassette 22 at the loading/ejecting position, and a door 48 pivotally supported between the fixed side plates 42 and adapted to open and close a loading/ejecting opening of the recording and reproducing apparatus not shown.

Each fixed side plate 42 has guide means adapted to guide the cassette holder 24 along the predetermined path in the supporting base body 26. The guide means comprises three guide tracks for respectively guiding the drive pin 36 and the guide pins 38 and 40. Each guide track has a first path parallel to the direction that the tape cassette 22 is inserted and ejected and a second path perpendicular to the first path. The guide tracks are constituted by a guide slot 50 for receiving the drive pin 36 and a pair of bottom-reinforced guide grooves 52 and 54 for respectively receiving the guide pins 38 and 40, respectively. The bottom-reinforced guide grooves 52 and 54 are formed to cross each other. At the cross area, the first guide groove 52 has a track portion extending along the first path while the second guide groove 54 has a track portion extending along the second path. The first guide groove 52 has a depth enough to approximately receive the full length of the longer guide pin 38 whereas the second guide groove 54 has a depth smaller than that of the first guide groove 52 to receive only the full length of the shorter guide pin 40.

As shown in FIG. 3, the drive mechanism 28 includes a motor 56 fixedly mounted to one of two fixed side plates 42 of the supporting base body 26, a gear train 58 arranged on the outer surface of the fixed side plate 42, and a drive lever 66 fixedly mounted to a shaft 62 rotatably mounted between the two fixed side plates 42 and radially extending from the center of the shaft 62. The drive lever 66 is coupled to an output shaft 60 of the motor 56 via the gear train 58. The drive lever 66 is provided at one end thereof with an input gear 64 engaged with the gear train 58 and at the other end portion, namely, the free end portion with a slot 68 for receiving the end of the drive pin 36 outwardly protruded through the guide slot 50 of the fixed side plate 42. As the drive lever 66 pivots about the shaft 62 by the drive force from the motor 56, it causes the drive pin 36 to slide along the slot 68 so that the drive pin 36 slides along the guide slot 50 of the fixed side plate 42.

Operation of the cassette loading device 20 having the above-mentioned construction will now be described.

As the tape cassette 22 is inserted into the cassette holder 24 at the loading/ejecting position shown in FIGS. 1A and 1B, the drive lever 66 of the cassette loading device pivots in anti-clockwise by the drive pin 36 provided at the corresponding sliding side plate 32, thereby causing the drive pin 36 and the guide pins 38 and 40 to slide along the guide slot 50 and the guide grooves 52 and 54, respectively. As a result, the tape cassette 22 is fed to the cassette loading position. On the way of the tape cassette 22 to the cassette loading position, a cassette door 23 of the tape cassette 22 pivots upwardly to be opened, as indicated by the dotted line in FIG. 1A.

The drive pin 36 and the guide pins 38 and 40 move along the similar L-shaped paths respectively defined by the guide slot 50 and the guide grooves 52 and 54. Accordingly, the tape cassette 22 received in the cassette holder 24 is introduced in the interior of the cassette loading device 20 in a horizontal direction parallel to the direction that it is inserted and ejected and then downwardly fed to be positioned at the recording/reproducing position so as to perform a recording/reproducing operation.

As mentioned above, at the cross area the first guide groove 52 has a deep track portion extending along the horizontally extending first path while the second guide groove 54 has a shallow track portion extending along the vertically extending second path perpendicular to the first path. Accordingly, during the movement of the cassette holder 24 the longer guide pin 38 is supported at its peripheral surface by a step surface 69 formed at the cross area between the first guide groove 52 and the second guide groove 54 when it passes the cross area. As a result, it is possible to prevent the longer guide pin 38 from erroneously entering the second guide groove 54 due to the gravity thereof. Thus a smooth movement of the cassette holder 24 can be ensured. When the shorter guide pin 40 passes the cross area, it does not interfere with the first guide groove 52 because the first guide groove 52 is deeper. Thus the shorter guide pin 40 can be smoothly moved.

Although the first guide groove 52 receiving the longer guide pin 38 is constituted by a bottom-reinforced groove, it may be constituted by a throughout slot. Of course, the same effect can be obtained in the latter case. Even though the shape and the material of each element of the cassette loading device are not limited, it is desirable that the relatively sliding elements are made of resin materials exhibiting a superior sliding property and a superior anti-abrasion property, taking into consideration the improvement of the slidability and the prevention of a damage due to a friction generated between relatively sliding members.

As apparent from the above description, the cassette loading device of the present invention has a construction wherein two guide grooves provided at the support base body to guide the cassette holder are arranged to cross each other on the fixed side plate of the support base body and have different depths to correspondingly receive guide pins of different lengths. By this construction, it is possible to prevent erroneous operations of the guide pins at the cross area defined between the guide grooves. The construction also provides a compactness of the cassette loading device. As a result, it is possible to achieve a compactness of the recording and reproducing apparatus while maintaining the high operation reliability of the cassette loading device.

Now, an erroneous cassette insertion preventing device which is applied to the cassette loading device in accordance with the present invention will be described.

Figure 5:
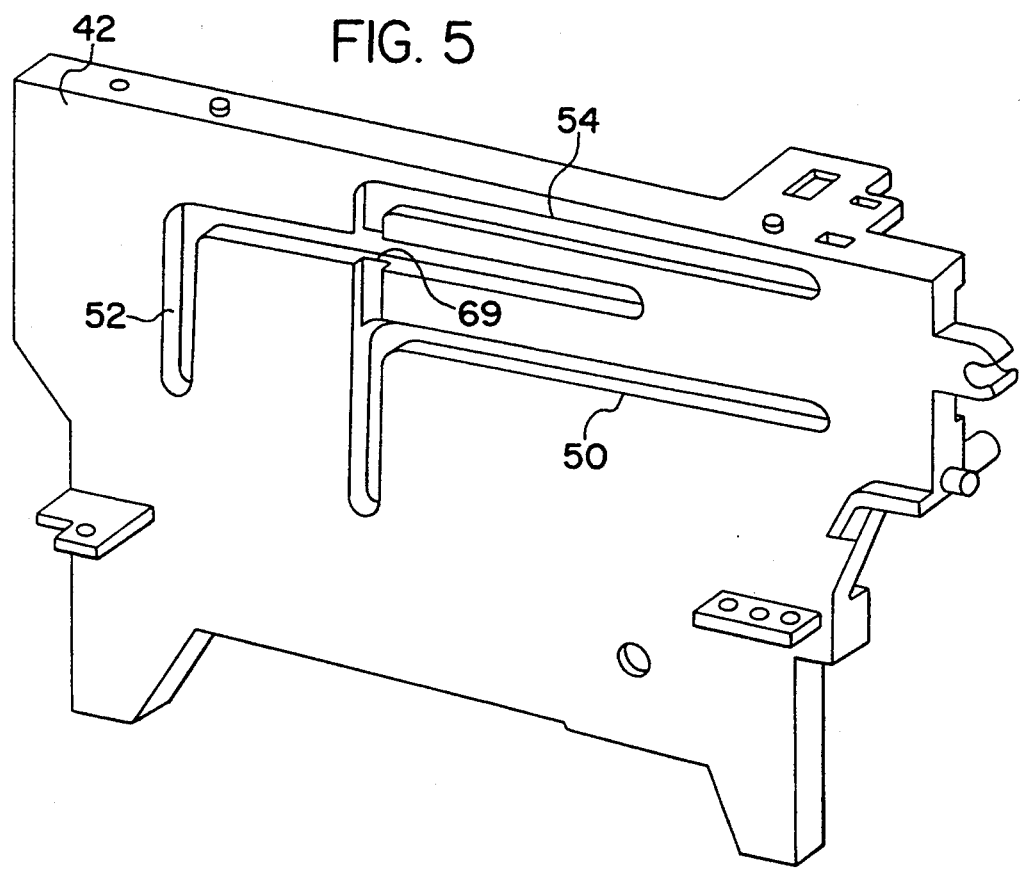
FIG. 5 is an enlarged perspective view of one of fixed side plates of the support base body shown in FIG. 3.
Figure 6:
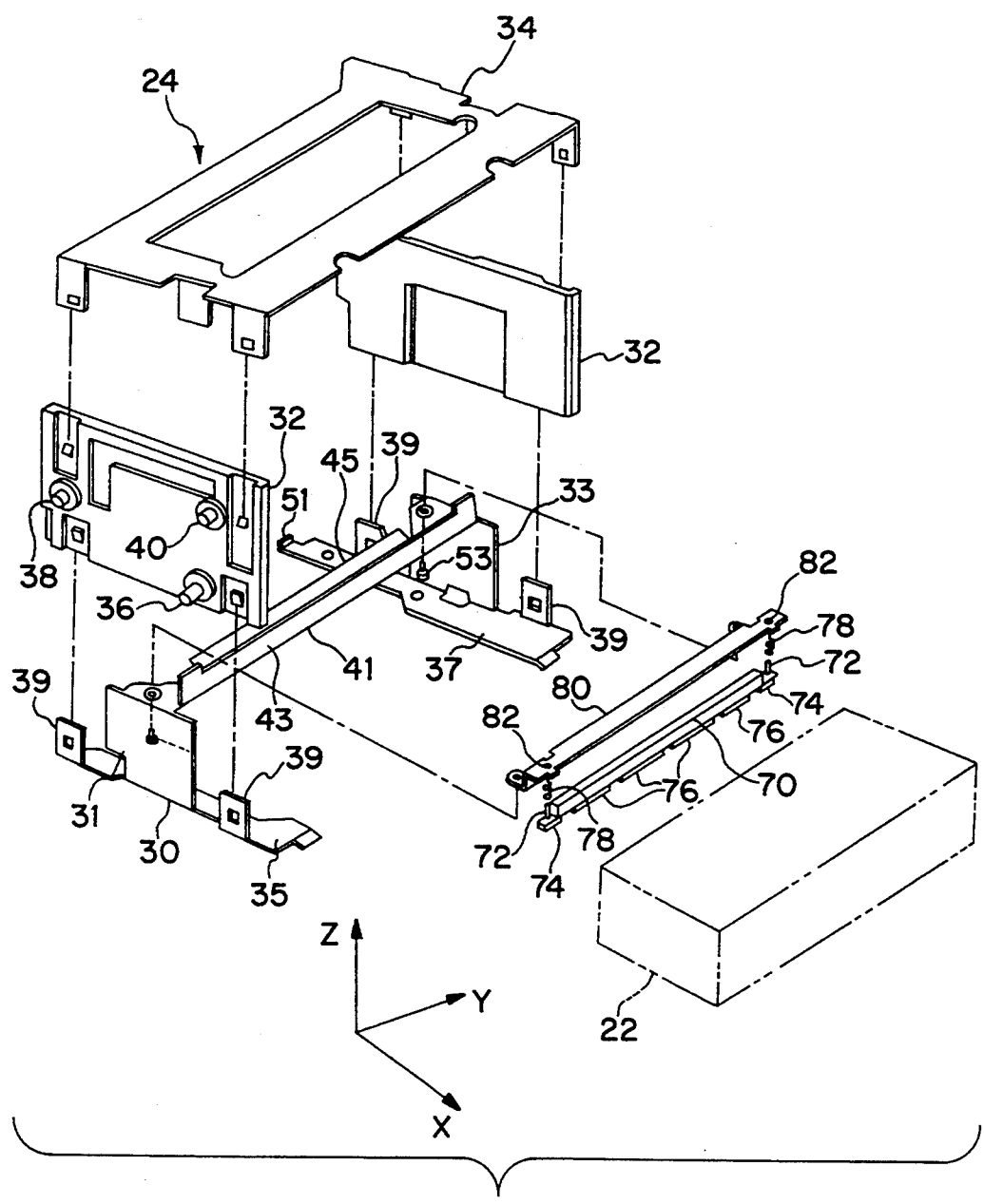
FIG. 6 is a schematic exploded view of the cassette loading device equipped with the erroneous insertion preventing device in accordance with the present invention.

FIG. 6 is an exploded view of the cassette loading device equipped 20 with an erroneous cassette insertion preventing device in accordance with the present invention. In FIG. 6, elements corresponding to those in FIGS. 1A to 5 are denoted by the same reference numerals. The cassette loading device 20 shown in FIG. 6 is of the front loading type in which a tape cassette 22 such as a 8 mm video tape cassette can be inserted from the front surface of a VCR in a X-direction.

Of course, the erroneous cassette insertion preventing device of the present invention may be applicable to tape cassettes other than 8 mm video tape cassette.

In the following description, X-axis means the direction that the tape cassette 22 is inserted and ejected. Y-axis means the direction approximately parallel to the rotation axes of tape supply and take-up reels of the tape cassette 22 and perpendicular to the X-axis. On the other hand, Y-axis means the direction perpendicular to both the X- and Z-axes.

The cassette loading device 20 includes a cassette holder 24 for holding the tape cassette 22. The cassette holder 24 includes a first frame 30 having a pair of side walls 31 and 33 arranged in parallel to each other in the direction that the tape cassette 22 is inserted along the X-axis, a pair of cassette support members 35 and 37 extending in parallel to each other along the X-axis and fixed to the lower ends of the side walls 31 and 33, respectively, and a connection member 41 extending along the Y-axis, namely, in the direction transverse to the cassette insertion direction and connecting the upper ends of the side walls 31 and 33. Preferably, the first frame 30 of the cassette holder 24 is formed by a pressing work to have an approximate inverted-U shape. In the first frame 30, the tape cassette 22 is received and supported.

The connection member 41 has an approximate V shape including two ribs 43 and 45 for providing a strength of the connection member 41. Between the ribs 43 and 45, an erroneous insertion preventing member 70 is disposed.

The erroneous insertion preventing member 70 is adapted to prevent an erroneous insertion of the tape cassette 22 and downwardly urge the tape cassette 22 to resiliently support the tape cassette 22. A pair of guide pins 72 are fixedly mounted to both ends of the erroneous insertion preventing member 70, respectively. Each of the guide pins 72 extends upwardly along the Z-axis. Above the erroneous insertion preventing member 70, a pressing plate 80 is disposed which is fixed at both ends thereof to the connection member 41. The pressing plate has a pair of guide holes 82 each receiving each corresponding one of the guide pins 72. Between the erroneous insertion preventing member 70 and the pressing plate 80, a pair of compression springs 78 are disposed which are arranged around the guide pins 72, respectively. The compression springs 78 serve to downwardly urge the erroneous insertion preventing member 70. A pair of spaced sliding side plates 32 are disposed outwardly of the side walls 31 and 33 of the first frame 31, respectively, so as to make the cassette loading device 20 slide along a predetermined path between a loading/ejecting position and a recording/reproducing position. The sliding side plates 32 are connected at their upper ends to each other by a second frame 34.

Figure 8A:
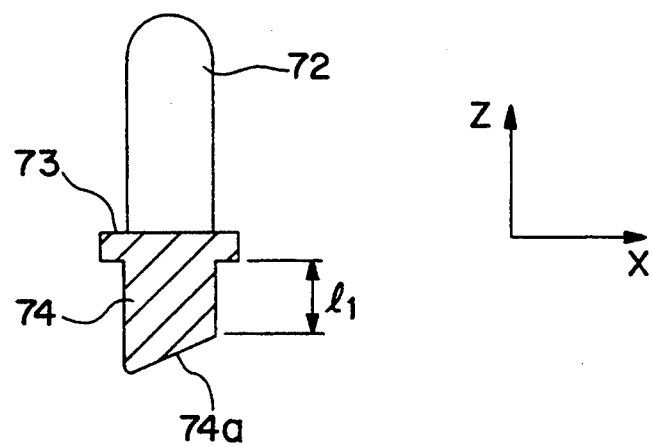
FIG. 8A is a cross-sectional view taken along the line IIIa—IIIa of FIG. 7.
Figure 8B:
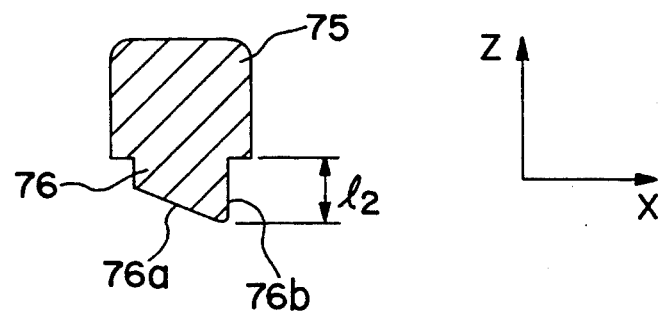
FIG. 8B is a cross-sectional view taken along the line IIIb—IIIb of FIG. 7.

Now, a preferred embodiment of the erroneous insertion preventing member 70 will be described, in conjunction with FIGS. 7 to 8B.

In accordance with this embodiment, the erroneous insertion preventing member 70 has a body 75 having a rectangular bar shape and extending along the Y-axis, namely, in a direction transverse to the cassette insertion direction. The body 75 may be constituted by a strip member without being limited to the bar shape. The body 75 has at both ends thereof a pair of extensions 71 to which the guide pins 72 are fixedly mounted, respectively. As mentioned above, the compression coil springs 78 are disposed around the guide pins 72, respectively, to downwardly urge the erroneous insertion preventing member 70 away from the pressing plate 80. The body 75 has at its lower surface a pair of first protrusions 74 respectively adapted to come into contact with the lateral end portions of the leading surface of the tape cassette 22 being inserted. The first protrusions 74 serve to upwardly move the erroneous insertion preventing member 70 along the Z-axis, namely, a direction approximately perpendicular to the cassette insertion direction when the tape cassette 22 is correctly inserted, thereby allowing the insertion of the tape cassette 22. The body 75 further has at its lower surface a plurality of protrusions 76 adapted to prevent the insertion of the tape cassette 22 when the tape cassette 22 is erroneously inserted. The first protrusions 74 extend downwardly through slots 47 (FIG. 10) formed at the cassette holder connection member 41, respectively, whereas the second protrusions 76 extend downwardly through slots 49 (FIG. 10) formed at the cassette holder connection member 41, respectively. Accordingly, the first protrusions 74 and the second protrusions 76 are protruded into the insertion path for the tape cassette 22.

Shapes of the protrusions 74 and 76 will now be described, in conjunction with FIG. 8 which shows a cross-section of the erroneous insertion preventing member 70.

Each of the first protrusions 74 has an inclined surface 74a forwardly extending along the X-axis. The inclined surface 74a comes into contact with the leading end surface of the tape cassette 22 being inserted and upwardly slides along the Z-axis, thereby causing the erroneous insertion preventing member 70 to upwardly move away from the tape cassette 22. By this movement, the first protrusions 74 and the second protrusions 76 are removed out of the tape cassette insertion path.

On the other hand, each of the second protrusions 76 has an inclined surface 76a rearwardly extending along the X-axis, in opposite to the inclined surface 74a and allowing an ejection of the tape cassette 22 loaded. The second protrusion 76 also has a contact surface 76b facing toward the loading/ejecting opening of the recording and reproducing apparatus. Where the tape cassette 22 is erroneously inserted, the contact surface 76b comes into contact with the leading end surface of the tape cassette 22 erroneously inserted, thereby preventing a further insertion of the tape cassette 22.

Preferably, the front surface portion of each first protrusions 74 except for the inclined surface 74a has a length L1 larger than the full length L2 of each second protrusion 76 so that when the tape cassette 22 is correctly inserted, the inclined surface 74a comes into contact with the leading end surface of the tape cassette 22 before the contact surface 76b of each second protrusion 76 comes into contact with the leading end surface of the tape cassette 22 to prevent the insertion of the tape cassette 22. By this construction, the erroneous insertion preventing member 70 can be surely operated.

Figure 11A:
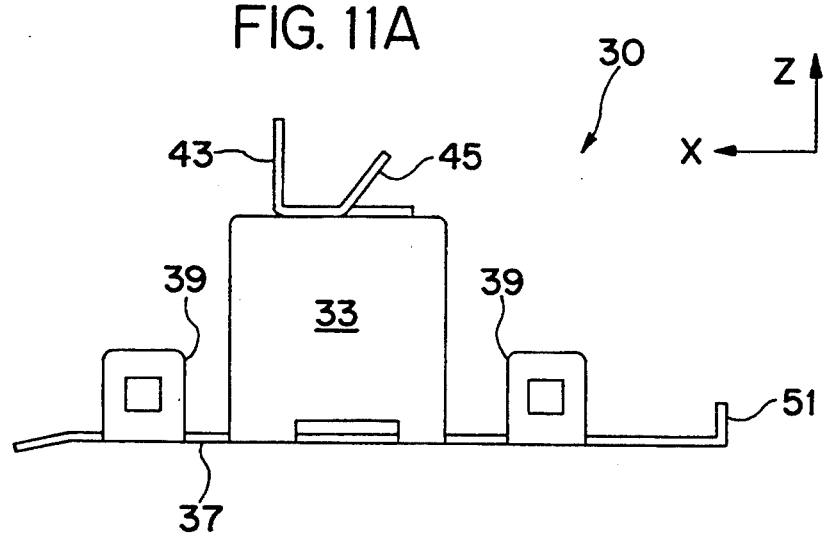
FIG. 11A is a side view taken along the line VIa—VIa of FIGS. 9 and 10.
Figure 11B:
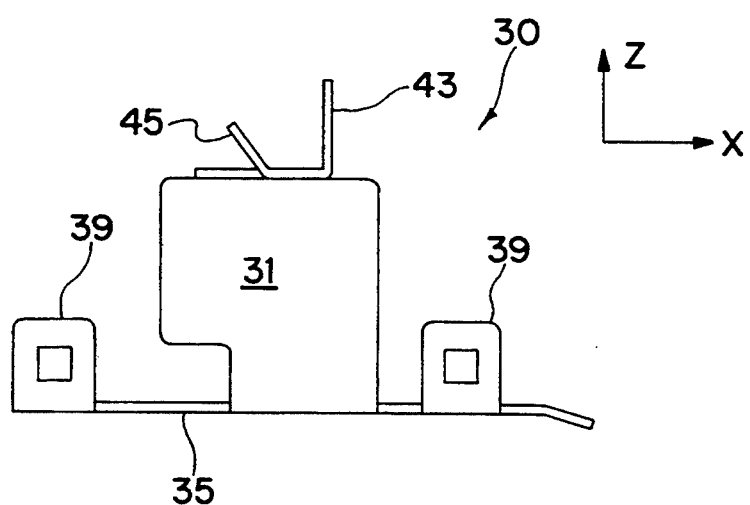
FIG. 11B is a side view taken along the line VIb—VIb of FIGS. 9 and 10.

The construction of the cassette holder 24 will be described in detail, in conjunction with FIGS. 9 to 11.

As mentioned above in conjunction with FIG. 6, the first frame 30 of the cassette holder 24 has the inverted-U-shaped construction including a pair of side walls 31 and 33 arranged in parallel to each other along the X-axis, a pair of cassette support members 35 and 37 extending in parallel to each other along the X-axis and fixed to the lower ends of the side walls 31 and 33, respectively, and the connection member 41 adapted to connect the upper ends of the side walls 31 and 33 to each other. The tape cassette 22 is received in the first frame 20 of the cassette holder 24, as indicated by the dotted line in FIGS. 9 and 10.

At the bottom of the V-shaped groove defined by the ribs 43 and 45, the connection member 41 has at both ends thereof a pair of first slots 47 for respectively receiving the first protrusions 74 of the erroneous insertion preventing member 70 and a plurality of second slots 49 (only two protrusions are shown in FIG. 10) for respectively receiving the second protrusions 76 of the erroneous insertion preventing member 70. The cassette support member 35 has a cassette stopper 51 with which the leading end surface of the tape cassette 22 being inserted comes into contact so as to be held in position in the cassette holder 24.

It is understood that the tape cassette 22 received in the cassette holder 24 is also held in position by the first protrusions 74 of the erroneous insertion preventing member 70 downwardly urged against the upper surface of the cassette holder 22 by the spring force of the compression coil springs 78.

As shown in FIG. 1B, the tape cassette 22 is inserted into the cassette holder 24 while pivoting the front door 48 pivotally mounted at the front cassette insertion opening of a front plate 55 of the VCR. FIG. 1B shows a state that the tape cassette 22 has been inserted to the inner-most position of the cassette loading device at which the leading end surface of the tape cassette 22 comes into contact with the cassette stopper 51 of the cassette holder 24.

Figure 4:
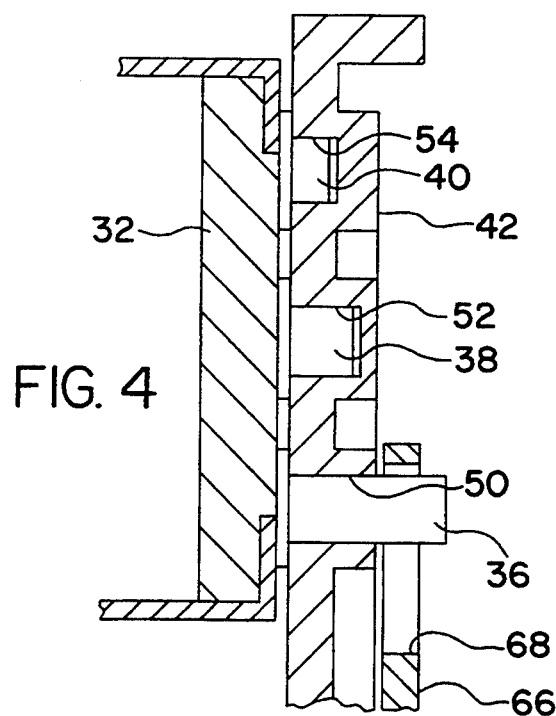
FIG. 4 is a cross-sectional view taken along the line IV—IV of FIG. 1A.

As best shown in FIGS. 1B, 4 and 5, the cassette holder 24 has the cassette support members such as the cassette support members 35 and 37 only at both lateral ends of the cassette holder 24. At the central portion of the cassette holder 24, there is no support member for supporting the tape cassette 22. Where the tape cassette 22 is longitudinally inserted, such a construction can not support the tape cassette 22 erroneously inserted, thereby resulting in a damage of the internal elements of the VCR by the tape cassette 22. For preventing such a phenomenon, a cassette support bar 46 is disposed beneath a position corresponding to the inserted tape cassette 22 in accordance with the present invention.

Although the erroneous insertion preventing member 70 has been illustrated as being disposed over the cassette holder 24 as shown in FIG. 1B, it may be disposed beneath the cassette holder 24 or over the second frame 34.

Since the cassette loading device feeds both the tape cassette 22 and the cassette holder 24 to the cassette loading position while holding the tape cassette 22 in the cassette holder 24, the relative position relationship between the tape cassette 22 and the cassette holder 24 is unchanged throughout the movement from the cassette ejecting position and the cassette loading position. Accordingly, the relative position relationship between the cassette door 23 and the cassette holder 24, in particular, its connection member 41 is unchanged. As shown in FIG. 1B, the connection member 41 of the cassette holder 24 is arranged at a position apart a distance $P_3$ from the rear end of the cassette holder 24 so as not to interfere with the opened cassette door 23. The connection member 41 should also be spaced a distance $P_2$ from the inner end of the front door 48 so that it does not interfere with the front door 48 upwardly pivoted upon inserting the tape cassette 22. Also, the tape cassette 22 should secure a predetermined ejection length $P_0$ outwardly protruded from the front end of the VCR. In an embodiment of the present invention for 8 mm video tape cassettes, $P_0$, $P_1$, $P_2$ and $P_3$ are determined to be 10.0 mm, 20.0 mm, 5.9 mm, and 26.6 mm, respectively, taking into consideration that the length of the tape cassette extending in the cassette insertion direction is 62.5 mm.

Operation of the erroneous insertion preventing device in accordance with the present invention will now be described, in conjunction with FIGS. 6 and 12 to 15.

First, the description will be made in conjunction with a case where the tape cassette 22 is correctly inserted, as shown in FIG. 6. In this case, the tape cassette 22 is received in the cassette holder 24 and then fed to the erroneous insertion preventing member 70 while upwardly pivoting the VCR front door 48, as shown in FIG. 13, a cross-sectional view taken along the line IX—IX of FIG. 12. As well-known, in some tape cassette such as 8 mm video tape cassettes, the cassette door 23 has an inclined upper surface. When the tape cassette 22 is inserted, the inclined upper surface 22a of the cassette door 23 comes into contact with the inclined surfaces 74a of the first protrusions 74 of the erroneous insertion preventing member 70 and pushes the erroneous insertion preventing member 70 upwardly against the spring force of the compression coil springs 78. By this upward movement of the erroneous insertion preventing member 70, the first protrusions 74 and the second protrusions 76 are removed out of the cassette insertion path so that the tape cassette 22 can be further fed without interfering with the erroneous insertion preventing member 70.

Figure 15:
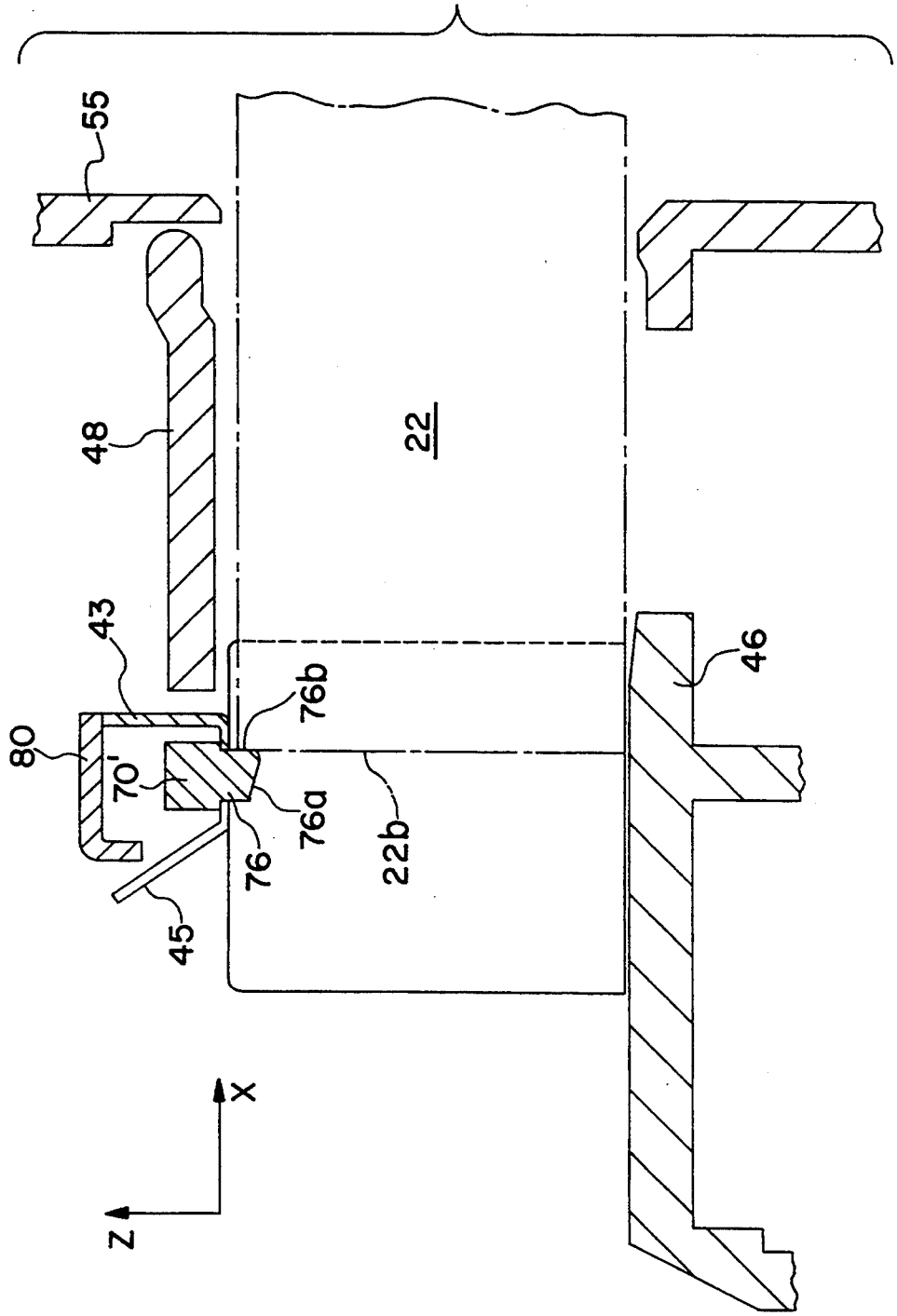
FIG. 15 is a cross-sectional view taken along the line XI—XI of FIG. 14.

It should be noted that the front surface portion of each first protrusions 74 except for the inclined surface 74a has a length L1 larger than the full length L2 of each second protrusion 76. By this construction, the inclined surface 74a comes into contact with the leading end surface of the tape cassette 22 before the contact surface 76b of each second protrusion 76 comes into contact with the leading end surface of the tape cassette 22. Accordingly, it is possible to surely operate the erroneous insertion preventing member 70.

Where the tape cassette 22 is erroneously inserted in is cassette loading device under a condition that it is longitudinally laid, as shown in FIG. 14, the leading end surface, namely, the side surface 22b of the tape cassette 22 received in the cassette holder while upwardly pivoting the front door 48 comes into contact with the contact surfaces 76b of the second protrusions 76b of the erroneous insertion preventing member 70, as shown in FIG. 15, a cross-sectional view taken along the line XI—XI of FIG. 14. As a result, a further insertion of the tape cassette 22 is prevented.

As apparent from the above description, the erroneous insertion preventing device in accordance with the present invention prevents an erroneous cassette insertion surely, because when a tape cassette is erroneously inserted, the second protrusions of the erroneous insertion preventing member comes into contact with the cassette tape. As a result, there is no problem of a damage of the internal mechanism of the VCR. By this erroneous insertion preventing device, a VCR with a high reliability can be provided. In particular, the erroneous insertion preventing device of the present invention is simple and thus inexpensive in construction.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A front loading cassette device for a recording and reproducting apparatus comprising:
   a cassette holder for holding a tape cassette to be loaded and ejected in a transversely laid position;
   a supporting base body for receiving said cassette holder and movably supporting it, so that it is movable between a cassette loading/ejecting position and a recording/reproducing position;
   said supporting base body including a pair of fixed side plates spaced from and parallel to each other, each of said plates including:
   (a) three guide tracks, each guide track including a first guiding portion that is horizontal to an edge of said plate and a second guiding portion perpendicular to said first guiding portion; and
   (b) a first guiding portion of one of said tracks being crossed by a second guiding portion of another track;
   said cassette holder including a pair of sliding side plates including means for supporting and spacing said sliding side plates parallel to each other;
   each of said sliding side plates including;
   a drive pin and a pair of guide pins engageable with the first and second guide portions of said fixed side plates, so that a horizontal and vertical movement of a tape cassette can be performed between a loading/ejecting position and a recording/reproducing position; and
   a driving mechanism for moving the cassette holder in the support base body.

2. A front loading cassette device in accordance with claim 1, wherein:
   said first guide portion of each of said guide tracks extends in parallel to a cassette ejecting direction and said second guide portion of the same guide track is perpendicular to the first guide portion so that all the guide tracks define similar L-shaped paths for guiding the pins, respectively;
   one of said guide pins has a length longer than that of the other guide pin, the guide pins located on the same sliding plate and said guide tracks include grooves for receiving said drive pins, a first guide groove for receiving the longer guide pin and a second guide groove for receiving the shorter guide pin, respectively; and
   said first and second guide grooves are formed on each of said fixed side plate to cross each other so that the first guide groove has a track portion extending along the first guide portion while the second guide groove has a track portion extending along the second guide portion at a cross area between the first and second guide grooves, and said first guide groove has depth that extends into said fixed plate that is a size to receive substantially the full length of the longer guide pin and the second guide groove has a depth that extends into said fixed plate smaller than that of the first guide groove to receive only the full length of the shorter guide pin.

3. A front loading cassette device in accordance with claim 1, wherein each of said guide tracks is L shaped and the first guide portion of each of said tracks are parallel to each other and a second portion of one of said tracks is coincident with a second portion of another of said tracks.

4. A front loading cassette device in accordance with claim 1, wherein said sliding plates are located inboard of said fixed plates and said pins extend in an outward lengthwise position in said guide tracks.

5. A front loading cassette device in accordance to claim 1, wherein said sliding plates are formed of resin.

6. A front loading cassette in accordance to claim 1, wherein each second guiding portion extends in the same direction.

7. A front loading cassette in accordance to claim 1, wherein the second guiding portion that crossed the first guiding portion extends beyond the first guiding portion.

8. A front loading cassette device for a recording and reproducing apparatus comprising:
   a cassette holder for holding a tape cassette to be loaded and ejected in a transversely laid position;
   a supporting base body for receiving said cassette holder and movably supporting it so that it is movable between a cassette loading/ejecting position and a recording/reproducing position;
   said supporting body including a pair of fixed side plates spaced from and parallel to each other, each of said plates including:
   (a) three guide tracks, each guide track including a first guiding portion that is horizontal to an edge of said plate and a second guiding portion perpendicular to said first guiding portion; and
   (b) a first guiding portion of one of said tracks being crossed by a second guiding portion of another track;

said cassette holder including a pair of sliding side plates including means for supporting and spacing said sliding side plates parallel to each other;

each of said sliding side plates including;

a drive pin and a pair of guide pins engageable with the first and second guide portions of said fixed side plates, so that a horizontal and vertical movement of a tape cassette can be performed between a loading/ejecting position and a recording/reproducing position;

a driving mechanism for moving the cassette holder in the supporting base body;

an erroneous insertion preventing member mounted to a connection member constituting a part of the cassett holder and adapted to prevent an erroneous insertion of the tape cassette;

supporting means for supporting said erroneous insertion preventing member; and a resilience member for resiliently supporting the erroneous insertion preventing member.

* * * * *